(12) United States Patent
Bird et al.

(10) Patent No.: US 9,850,651 B2
(45) Date of Patent: Dec. 26, 2017

(54) DIFFUSER BAFFLE FOR GREASE INTERCEPTOR

(71) Applicant: Canplas Industries Ltd., Barrie (CA)

(72) Inventors: Andrew Bird, Shanty Bay (CA);
James Brian Mantyla, Barrie (CA);
James Edwin Tesky, Barrie (CA);
Richard Alan Parkinson, Barrie (CA)

(73) Assignee: Canplas Industries Ltd., Barrie (CA)

( * ) Notice: Subject to any disclaimer, the term of this patent is extended or adjusted under 35 U.S.C. 154(b) by 0 days.

(21) Appl. No.: 15/150,498

(22) Filed: May 10, 2016

(65) Prior Publication Data

US 2016/0305110 A1 Oct. 20, 2016

Related U.S. Application Data

(63) Continuation of application No. 13/440,576, filed on Apr. 5, 2012, now Pat. No. 9,415,329.

(30) Foreign Application Priority Data

Feb. 28, 2012 (CA) .................................... 2769800

(51) Int. Cl.
| | |
|---|---|
| *E03F 5/16* | (2006.01) |
| *B01D 17/04* | (2006.01) |
| *C02F 1/00* | (2006.01) |
| *C02F 1/40* | (2006.01) |
| *B01D 17/02* | (2006.01) |
| *C02F 101/32* | (2006.01) |
| *C02F 103/32* | (2006.01) |

(52) U.S. Cl.
CPC ............ *E03F 5/16* (2013.01); *B01D 17/0211* (2013.01); *B01D 17/045* (2013.01); *C02F 1/001* (2013.01); *C02F 1/40* (2013.01); *C02F 2101/32* (2013.01); *C02F 2101/325* (2013.01); *C02F 2103/32* (2013.01)

(58) Field of Classification Search
CPC ........................................................ E03F 5/16
See application file for complete search history.

(56) References Cited

U.S. PATENT DOCUMENTS

| | | | |
|---|---|---|---|
| 2,102,430 | A | 12/1937 | McLeod |
| 2,272,912 | A | 2/1942 | Heinkel |
| 2,638,177 | A | 5/1953 | Heindlhofer |

(Continued)

FOREIGN PATENT DOCUMENTS

| | | |
|---|---|---|
| CA | 2299134 A1 | 8/2001 |
| CA | 2672865 A1 | 8/2002 |

*Primary Examiner* — Peter Keyworth
(74) *Attorney, Agent, or Firm* — Hoffmann & Baron, LLP

(57) ABSTRACT

A diffuser baffle for use in an in-line wastewater grease interceptor. The diffuser baffle lies within a grease collecting chamber between the inflow and outflow of a grease interceptor. The diffuser baffle has an open bottom which is sized and shaped respectively to fit into the grease collecting chamber. The diffuser baffle has an end operatively connected to the inflow opening to permit wastewater to flow into the body through the open bottom. The baffle has a downstream end which includes a deflector portion to deflect a wastewater stream in a direction generally into the grease collecting chamber. The body also includes a number of apertures to permit the deflected wastewater stream to pass through the baffle and into the grease collecting chamber, where FOG will separate before waste water exits the chamber through the outlet baffle.

22 Claims, 16 Drawing Sheets

(56) References Cited

U.S. PATENT DOCUMENTS

| | | | |
|---|---|---|---|
| 4,113,617 | A | 9/1978 | Bereskin et al. |
| 4,940,539 | A | 7/1990 | Weber |
| 5,431,826 | A | 7/1995 | Becker et al. |
| 6,120,684 | A | 9/2000 | Kistner et al. |
| 7,011,752 | B2 | 3/2006 | Broeders et al. |
| 7,300,588 | B2 | 11/2007 | Broeders et al. |
| 8,007,016 | B2 | 8/2011 | Mantyla et al. |
| 2013/0221545 | A1 | 8/2013 | Bird et al. |
| 2013/0313180 | A1 | 11/2013 | Bird et al. |

DIFFUSER BAFFLE FOR GREASE INTERCEPTOR

CROSS-REFERENCE TO RELATED APPLICATIONS

This application is a continuation of U.S. patent application Ser. No. 13/440,576, filed on Apr. 5, 2012, which in turn claims priority to Canadian Patent Application No. 2,769,800, filed on Feb. 28, 2012, the entire contents of which are incorporated by reference herein.

FIELD OF THE INVENTION

This invention relates generally to the field of wastewater management and in particular to grease interceptors of the type which are used on wastewater outflows from, for example, commercial food establishments. Grease interceptors are typically used to prevent fats, oils and grease ("FOG") from entering the sanitary sewage system. In particular, this invention relates to a directional diffuser baffle for use in such a grease interceptor.

BACKGROUND OF THE INVENTION

In many food preparation facilities, such as commercial kitchens and restaurants, the sink is a major tool used for disposing of various types of food waste. In some cases liquid food wastes, such as FOG are poured down the sink, and in other cases a mechanical chopper such as a garborator is used to shred the food waste as it leaves the sink and enters the wastewater system. Many food preparation establishments, such as commercial restaurants and the like, have multiple sinks for such food waste disposal.

In many jurisdictions, the disposal from commercial kitchens of FOG and FOG laden debris into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are connected to the wastewater effluent stream from the food preparation kitchen or other facility and are located before the sanitary sewer, typically within the kitchen. The grease interceptors may take a number of forms, but typically consist of an in-line container which is mounted at or below grade within the wastewater discharge system downstream of all of the sinks and the like. The container includes features that are configured to allow fats, oils and grease to float to the surface of the container where they can be skimmed off and physically removed for controlled disposal. In this way these wastes are removed from the wastewater before the wastewater enters the sanitary sewer system. Some examples of prior art grease interceptors include the following:

Canadian Patent No. 2,299,134 issued Sep. 1, 2009;
Canadian Patent Application No. 2,672,865 filed Feb. 23, 2000;
U.S. Pat. No. 2,272,912, issued Feb. 10, 1942;
U.S. Pat. No. 2,102,430 issued Dec. 14, 1937;
U.S. Pat. No. 4,940,539 issued Jul. 10, 1990;
U.S. Pat. No. 5,431,826 issued Jul. 11, 1995;
U.S. Pat. No. 7,011,752 issued Mar. 14, 2006;
U.S. Pat. No. 7,300,588 issued Nov. 27, 2007; and
U.S. Pat. No. 8,007,016 issued Aug. 20, 2011.

While these different inventions all have various features and benefits, a consistent problem is efficiently separating FOG from wastewater. Deflector plates have been used to attempt to increase separation of grease, but the deflectors may not create sufficient separation of FOG from wastewater. Moreover, deflector plates which are fixed to the grease interceptor surface may be difficult to clean. Attempts to increase separation of FOG by radically modifying the flow of wastewater may have the undesirable effect of creating turbulent flow, which can erode trapped grease from the surface and cause FOG to enter the sanitary sewer system. What is desired is a way to control the flow of fluid through a grease interceptor to effectively separate FOG from wastewater without excessively turbulent flow. What is also desired is a way to provide for the separation of FOG using a grease interceptor which can be cleaned more easily.

SUMMARY OF THE INVENTION

The present invention is directed to a diffuser baffle for an in-line wastewater grease interceptor. In particular, the diffuser baffle may be placed in a grease collecting chamber of an in-line wastewater grease interceptor. The diffuser baffle according to the present invention should also preferably establish a flow pattern with a low flow velocity, high air entrainment and high residence or transition time.

One embodiment of the present invention provides a diffuser baffle for use in an in-line wastewater grease interceptor. The grease interceptor has a wastewater inflow opening, an outflow opening and a grease collecting chamber hydraulically located between the inflow opening and the outflow opening. The diffuser baffle comprises an open bottomed component respectively sized and shaped to fit into said grease collecting chamber. The diffuser baffle has one end which is operatively connected to the inflow opening to permit wastewater flowing into the grease collecting chamber to flow into the baffle through the open bottom. The baffle has a downstream end which includes a deflector portion to deflect a wastewater stream in a direction generally in to the collecting chamber. The body includes a plurality of apertures to permit the deflected wastewater stream to pass through the baffle and into the grease collecting chamber before exiting the chamber through the outflow opening to permit FOG to rise and separate from the deflected wastewater stream in the grease collecting chamber.

BRIEF DESCRIPTION OF THE DRAWINGS

Reference will now be made, by way of example only, to preferred embodiments of the inventions and in which.

DETAILED DESCRIPTION OF THE PREFERRED EMBODIMENTS

Figure 1:
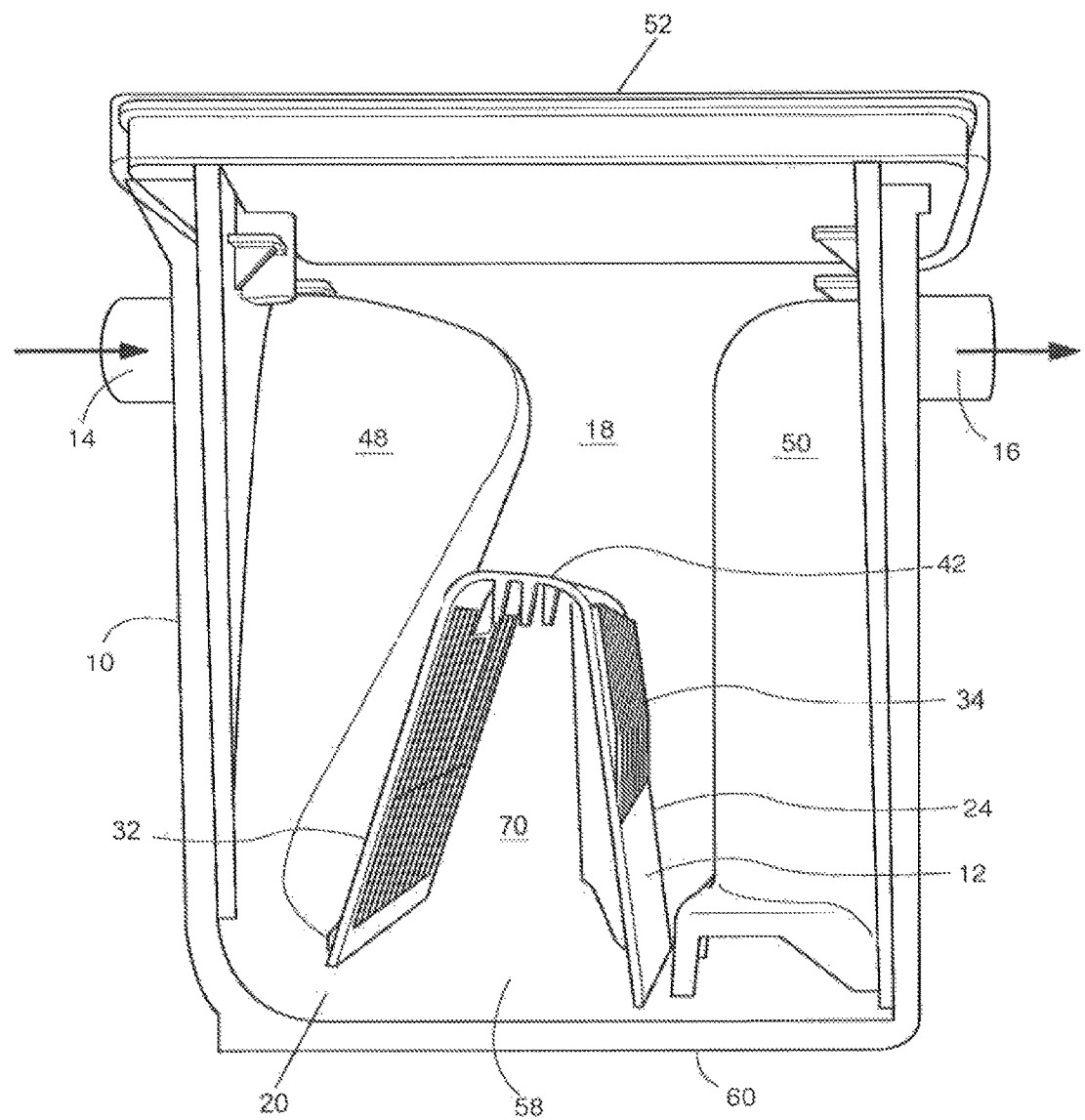
FIG. 1 is a cut-away side perspective view of an embodiment of a diffuser baffle in an in-line grease interceptor.
Figure 2:
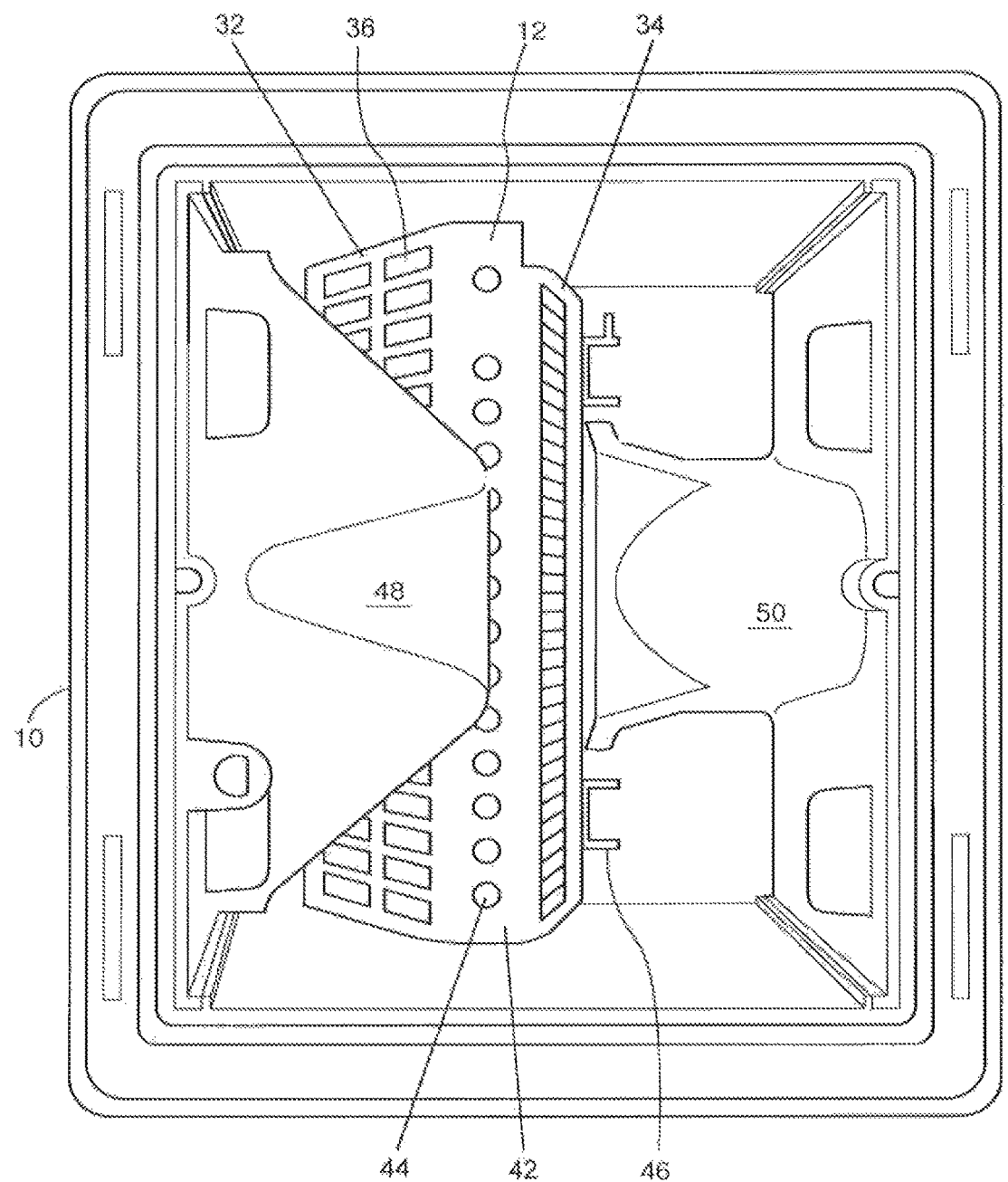
FIG. 2 is a top perspective view of an embodiment of the diffuser baffle in an in-line grease interceptor.
Figure 3:
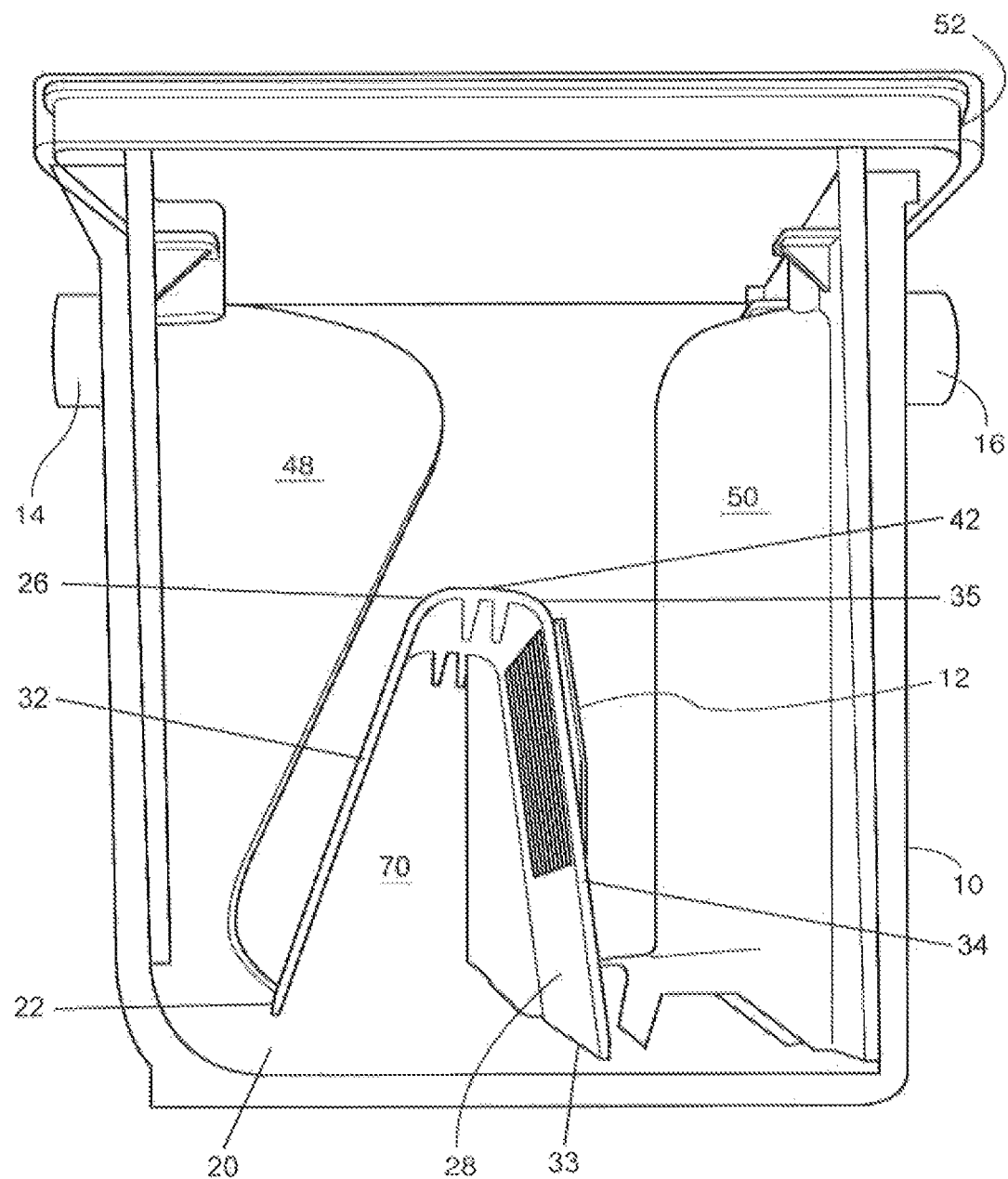
FIG. 3 is a cut-away side perspective view of an embodiment of the diffuser baffle in an in-line grease interceptor.

As shown in FIGS. 1-8, a diffuser baffle 12 sits in an in-line wastewater grease interceptor 10. The grease interceptor 10 has a wastewater inflow opening 14 and an outflow opening 16 and a grease collecting chamber 18. The grease collecting chamber 18 is hydraulically located between the inflow opening 14 and the outflow opening 16. The diffuser baffle 12 has an open bottom 20 and is generally sized and shaped to fit into the grease collecting chamber 18. The baffle has one end 22 which is operatively connected to the inflow opening 14 to permit wastewater flowing into the grease collecting chamber 18 to flow into the body 12 through the open bottom of the baffle 20. Furthermore in the most preferred embodiment, the inlet baffle 48 operatively engages with the diffuser baffle 12 to retain and locate the baffle 12 in position to resist displacement arising from flow and buoyancy effects during operation of the grease interceptor.

Figure 7:
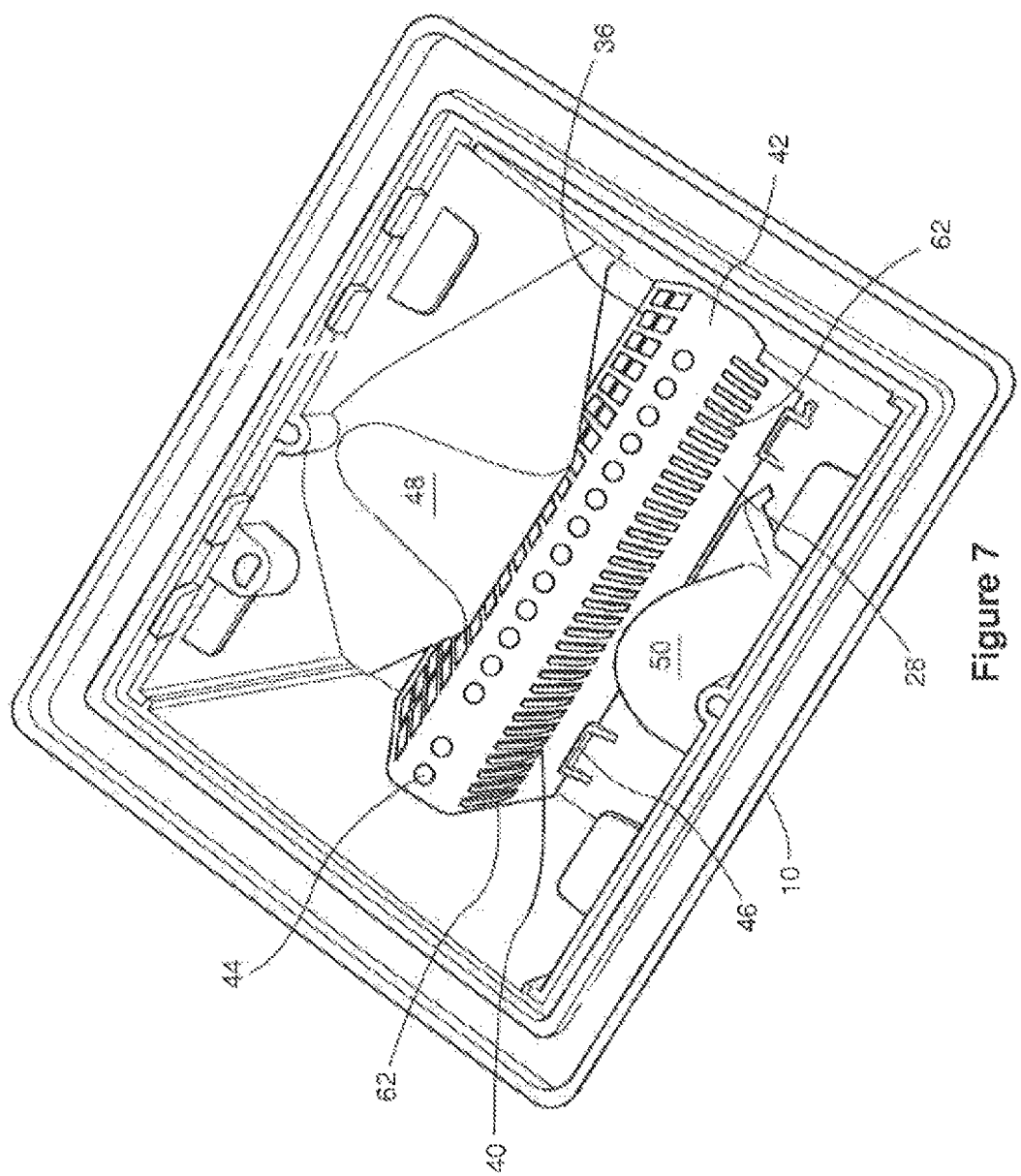
FIG. 7 is a top perspective view of an embodiment of the diffuser baffle in an in-line grease interceptor.

The diffuser baffle has a downstream face 24 which is generally located between the inflow opening 14 and functionally in line with the outflow opening 16 and includes a deflector portion 28 (FIG. 3) to deflect a wastewater stream in an upward direction generally away from the outflow opening 16. The baffle 12 includes a plurality of apertures, such as slots 36 and openings 44 as shown in FIG. 7, to permit the deflected wastewater stream to pass through the diffuser baffle 12 and into the grease collecting chamber 18 before exiting the chamber 18 through the outflow opening 16 to permit FOG to rise and separate from the deflected wastewater stream in the grease collecting chamber 18.

Figure 9:
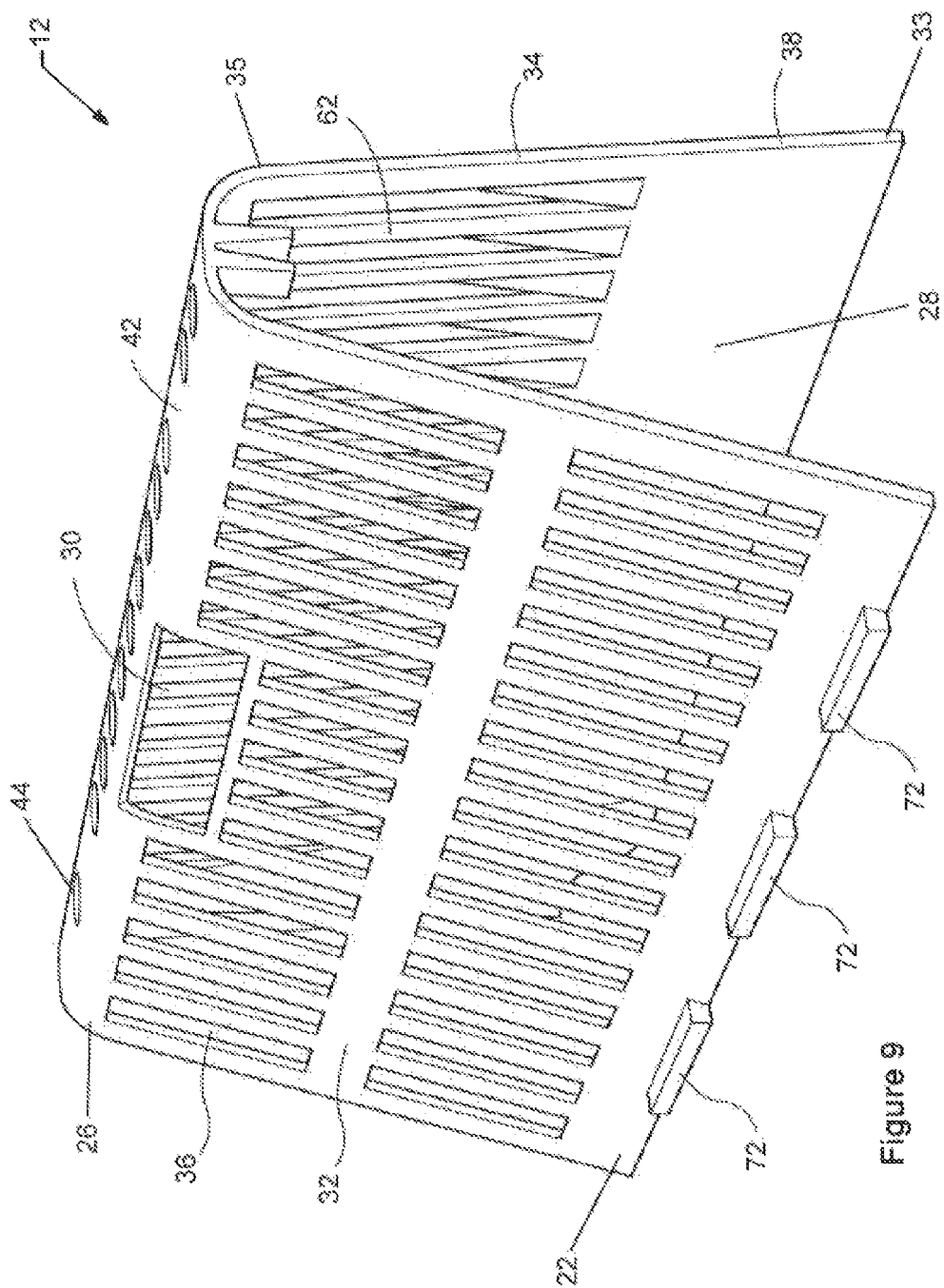
FIG. 9 is a side perspective view of an embodiment of the diffuser baffle.

The diffuser baffle 12 is removably mounted in the grease collecting chamber 18 and includes a handle 30 (FIG. 9) for lifting the diffuser baffle 12 out of the grease collecting chamber 18.

Figure 4:
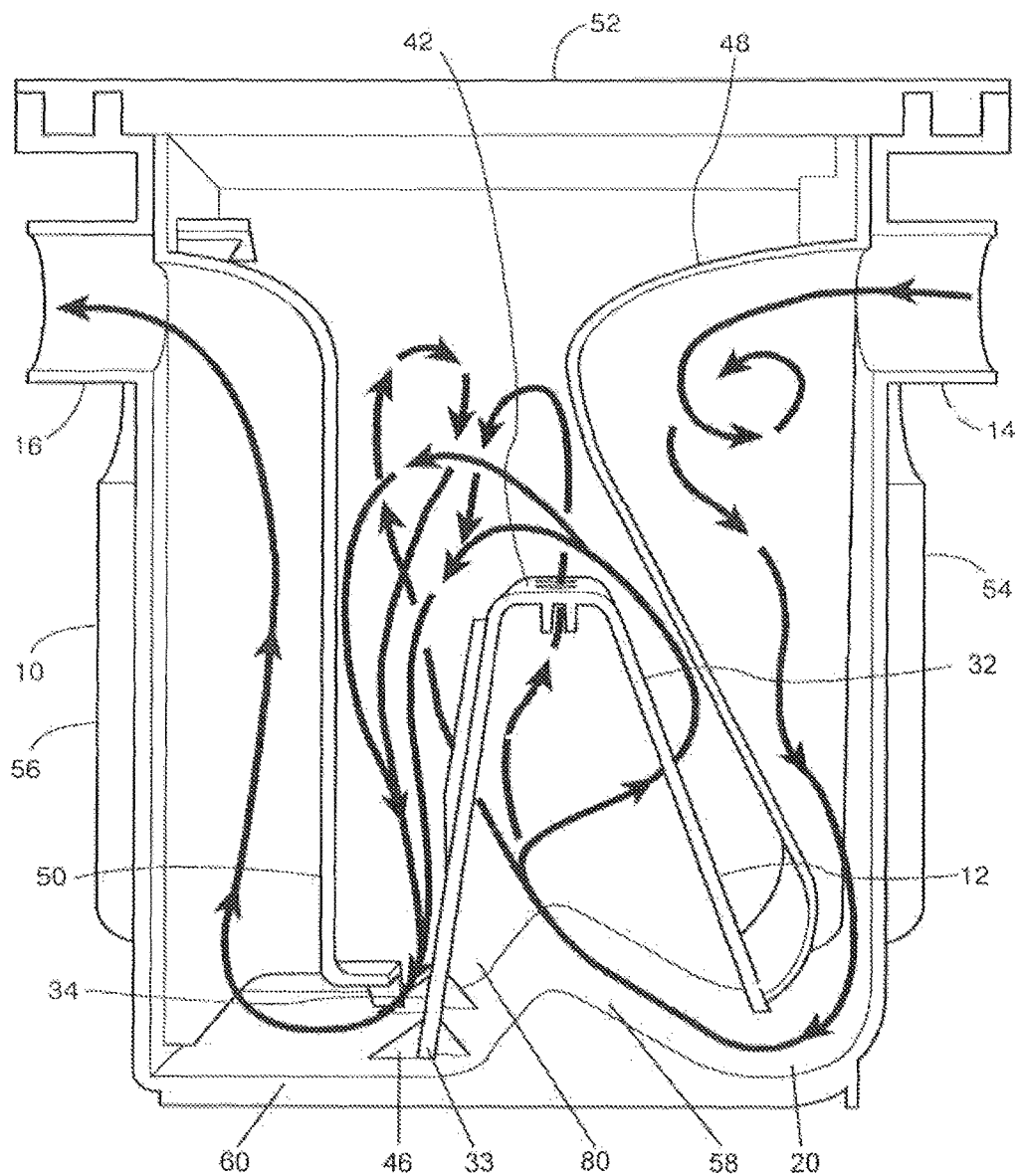
FIG. 4 is a cut-away side perspective view showing wastewater flow through an embodiment of the diffuser baffle in an in-line grease interceptor.

As shown in FIG. 4, the diffuser baffle 12 includes a first inclined face 32 facing an inlet side of the grease collecting chamber 18. The inlet side of the grease collecting chamber 18 lies between the first inclined face 32 of diffuser baffle 12 and the inward face of an inlet baffle 48. A second inclined face 34 of the diffuser baffle 12 faces an outlet side of the grease collecting chamber 18. The outlet side of the grease collecting chamber lies between the second inclined face 34 of the diffuser baffle 12 and the inward face of an outlet baffle 50. A top portion 42 of the diffuser baffle 12 connects the first inclined face 32 and second inclined face 34 together. The inlet baffle 48 lies adjacent to an inlet side wall 54 that includes the inflow opening 14. The outlet baffle 50 lies adjacent to an outlet side wall 56 that includes the outflow opening 16. The grease interceptor 10 has a cover 52. An interior space 70 is enclosed by a diffuser first panel 32, a diffuser second panel 34, and the top portion 42. The first panel 32 extends between a lower edge 22 and an opposite upper edge 26 attached to the top portion 42. The second panel 34 extends between a lower edge 33 and an opposite upper edge 35 attached to the top portion 42. The diffuser baffle 12 comprises the first panel 32, the second panel 34, and the top portion 42. The interior space 70 is in fluid communication with the grease collecting chamber 18.

Figure 10:
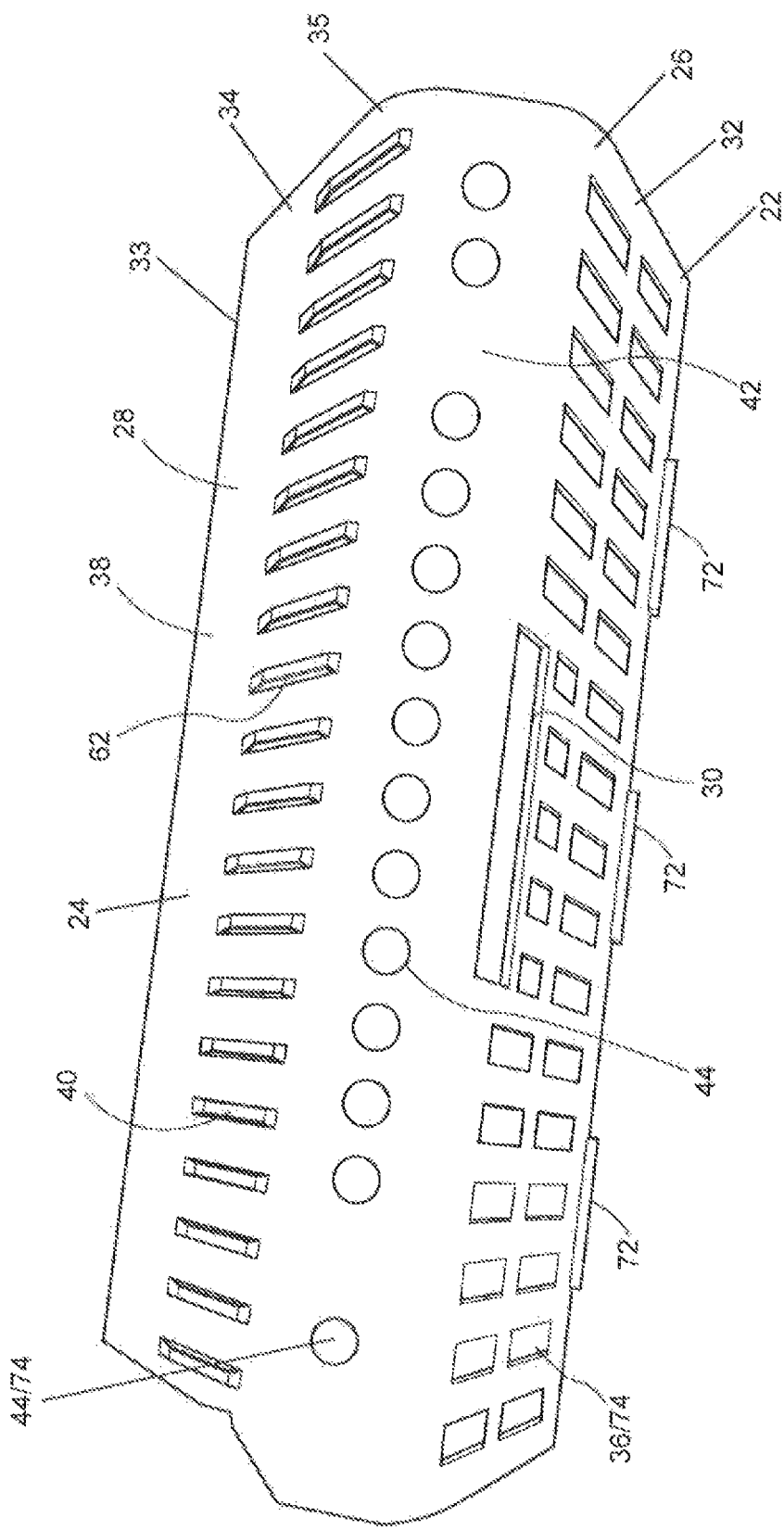
FIG. 10 is a top perspective view of an embodiment of the diffuser baffle.
Figure 11:
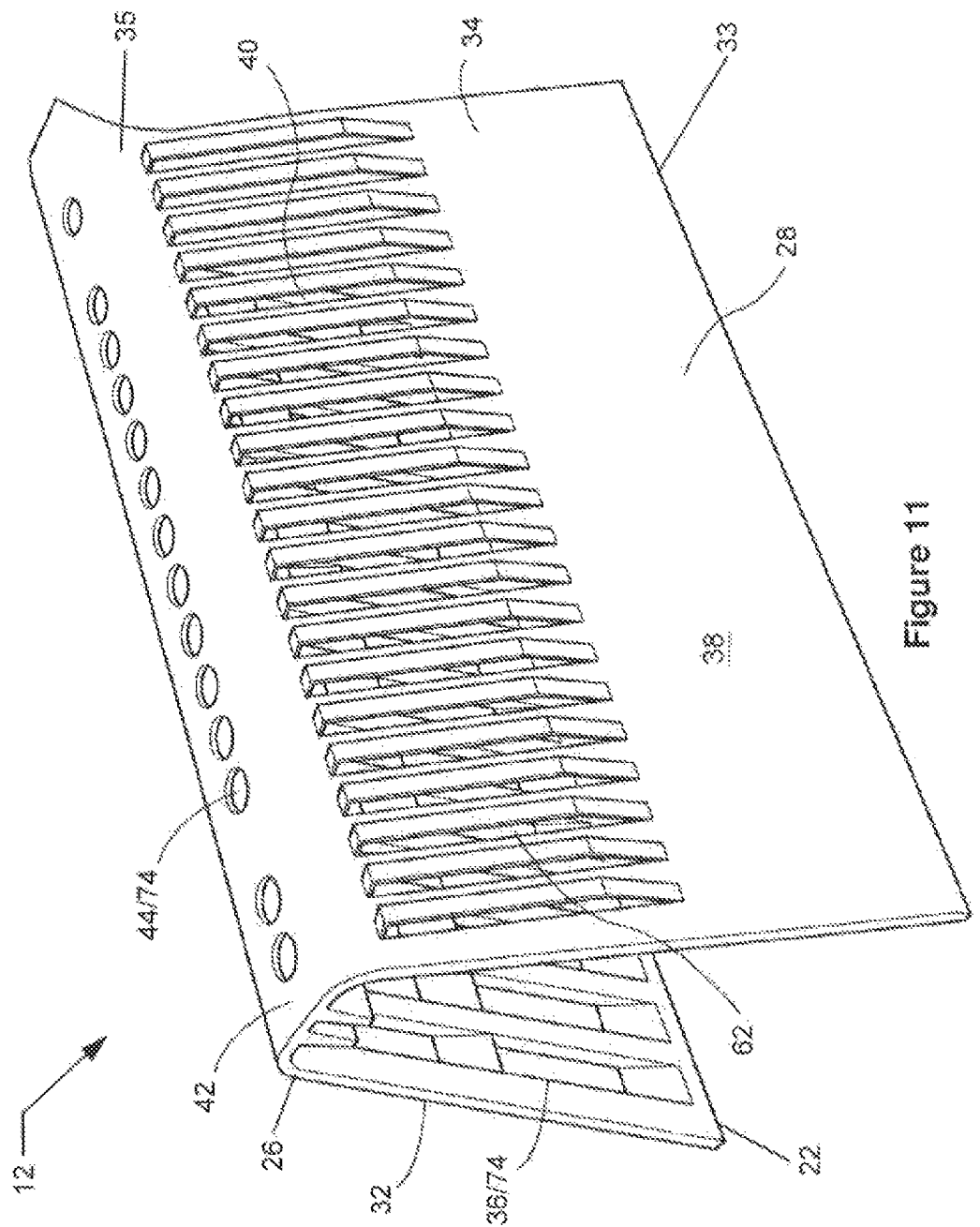
FIG. 11 is a side perspective view of an embodiment of the diffuser baffle.
Figure 12:
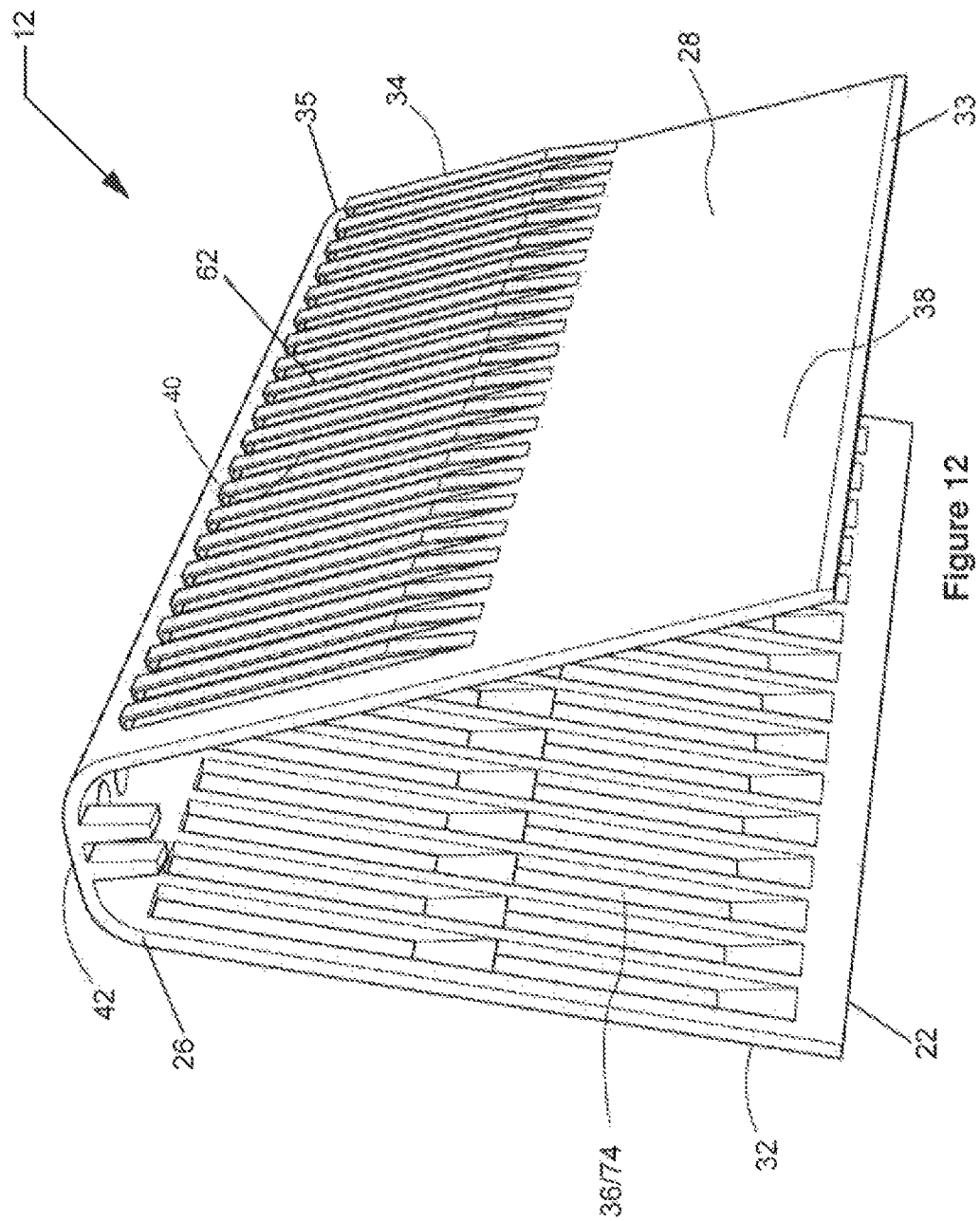
FIG. 12 is a side perspective view of an embodiment of the diffuser baffle.
Figure 13:
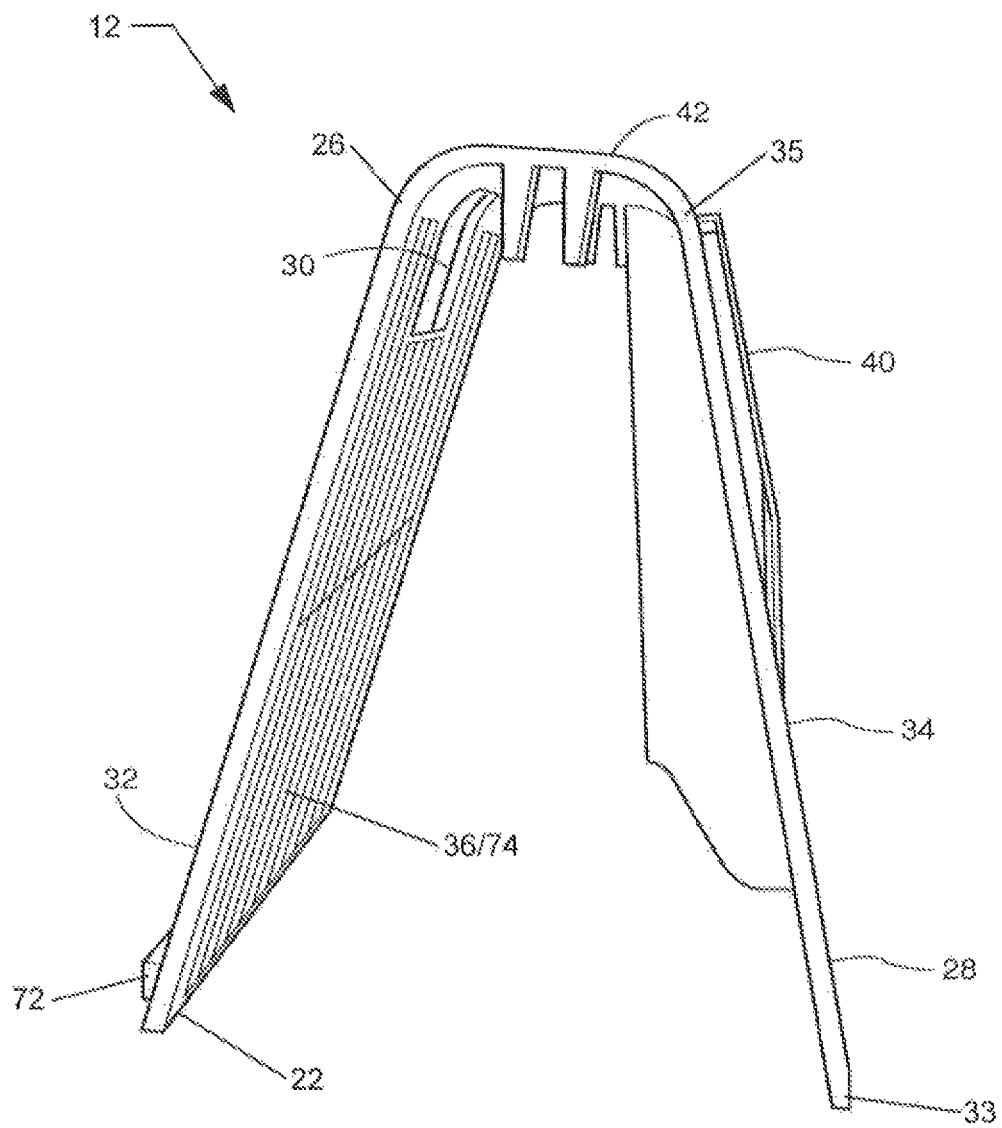
FIG. 13 is a side perspective view of an embodiment of the diffuser baffle.

As shown in FIGS. 9-13, the first inclined face 32 of the diffuser baffle 12 includes slots 36 to permit the deflected wastewater stream to pass through the slots 36 with substantially laminar flow. The second inclined face 34 of the diffuser baffle 12 includes the deflector portion 28 and has openings 62 above the deflector 28 to permit wastewater flow through the second inclined face 34 with substantially laminar flow. The flow through the openings 62 in the second inclined face 34 may be minimal except when the FOG and water transition is at or below the height of the diffuser baffle 12. The deflector 28 is a lower portion 38 of the second inclined face 34. The lower portion 38 has no openings for wastewater flow. In the embodiment shown in FIG. 9, the deflector 28 is the lower half of the second inclined face 34. The top portion 42 of the diffuser baffle 12 has a plurality of openings 44. The plurality of openings 44 may be generally circular, such as is shown in FIG. 10 where the plurality of openings 44 are circular openings aligned in a row along the length of the top portion 42. The present invention comprehends that the orientation of the openings 62 in combination with a substantially oliphillic material used to form the baffle 12 promotes coalescence of the Fat, Oil and Grease (FOG) to actively encourage separation of FOG from the waste water stream.

The diffuser baffle 12 is generally shaped like an inverted V or U when viewed from the side, as shown in FIG. 1. The first inclined face 32 and second inclined face 34 correspond generally to the sides of the inverted V. The bottom of the diffuser baffle 12 is open and wastewater exiting from the inlet baffle 48 will enter through the open bottom of the diffuser baffle 12 and exit substantially through the slots 36 and openings 44.

As shown in FIG. 10, the diffuser baffle 12 has retention tabs 72 to help locate and retain the diffuser baffle 12 in place in the in-line wastewater grease interceptor 10.

Figure 14:
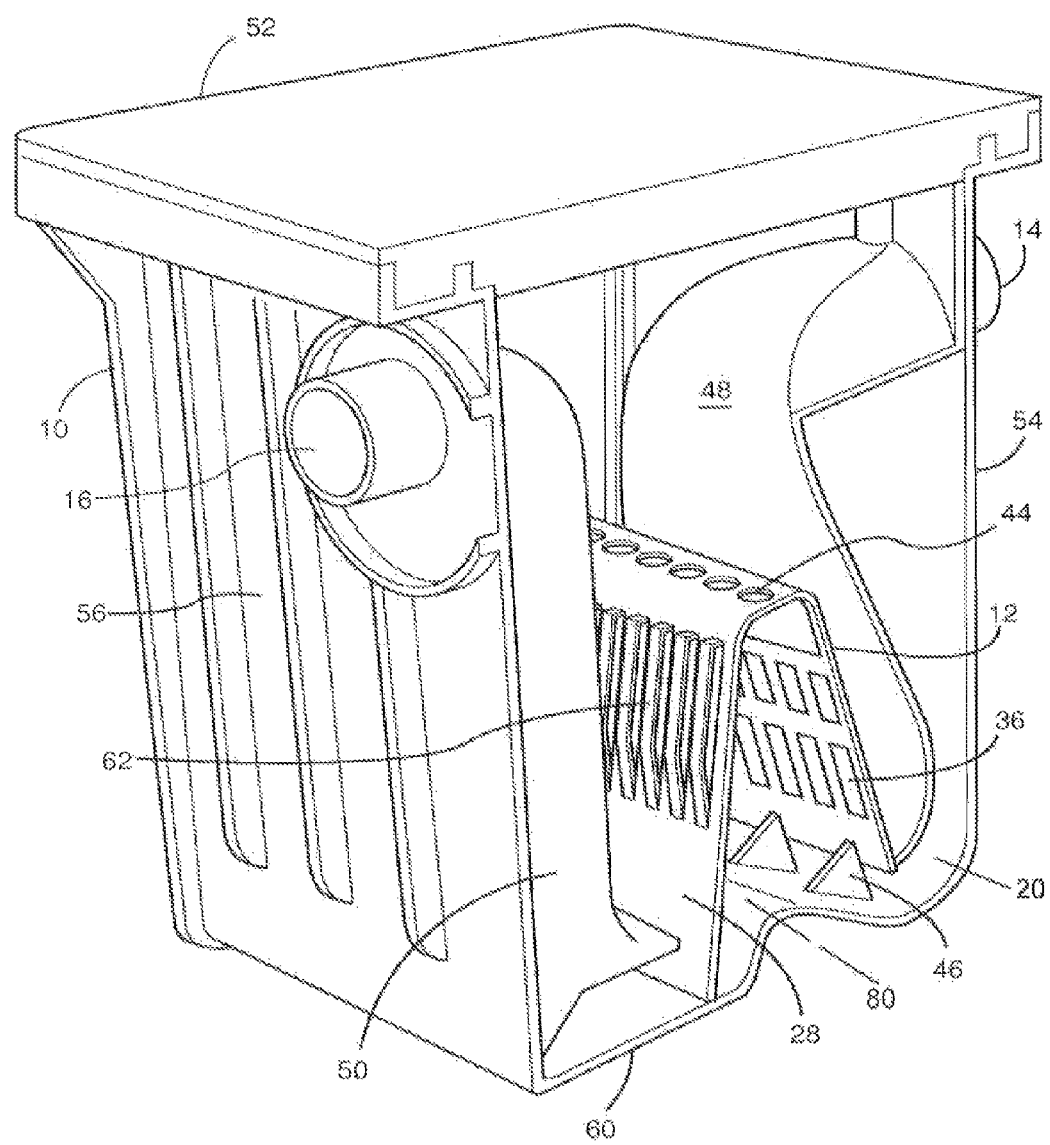
FIG. 14 is a cut-away side perspective view of an embodiment of the diffuser baffle in an in-line grease interceptor.
Figure 15:
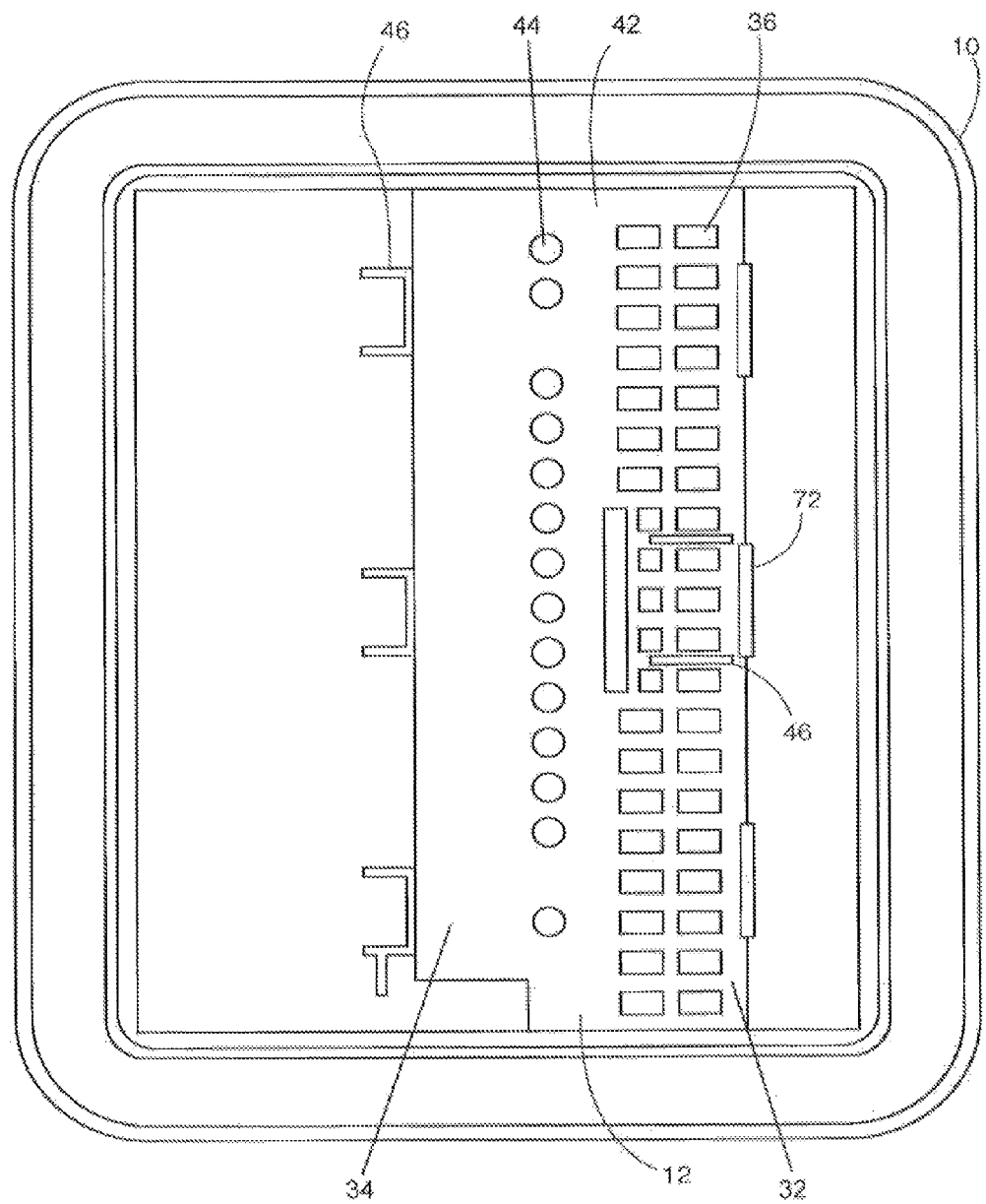
FIG. 15 is a top plan view of an embodiment of the diffuser baffle.

As shown in FIGS. 14-15, support ribs 46 guide, position and positively retain the diffuser baffle 12 in the grease interceptor. The retention tabs 72 in conjunction with the support ribs 46 serve to locate and retain the diffuser baffle 12. The retention tabs 72 interface with the inlet baffle 48 to retain the diffuser baffle 12 in position to prevent the diffuser baffle 12 from floating or shifting under the pressure of the liquid flow.

Figure 16:
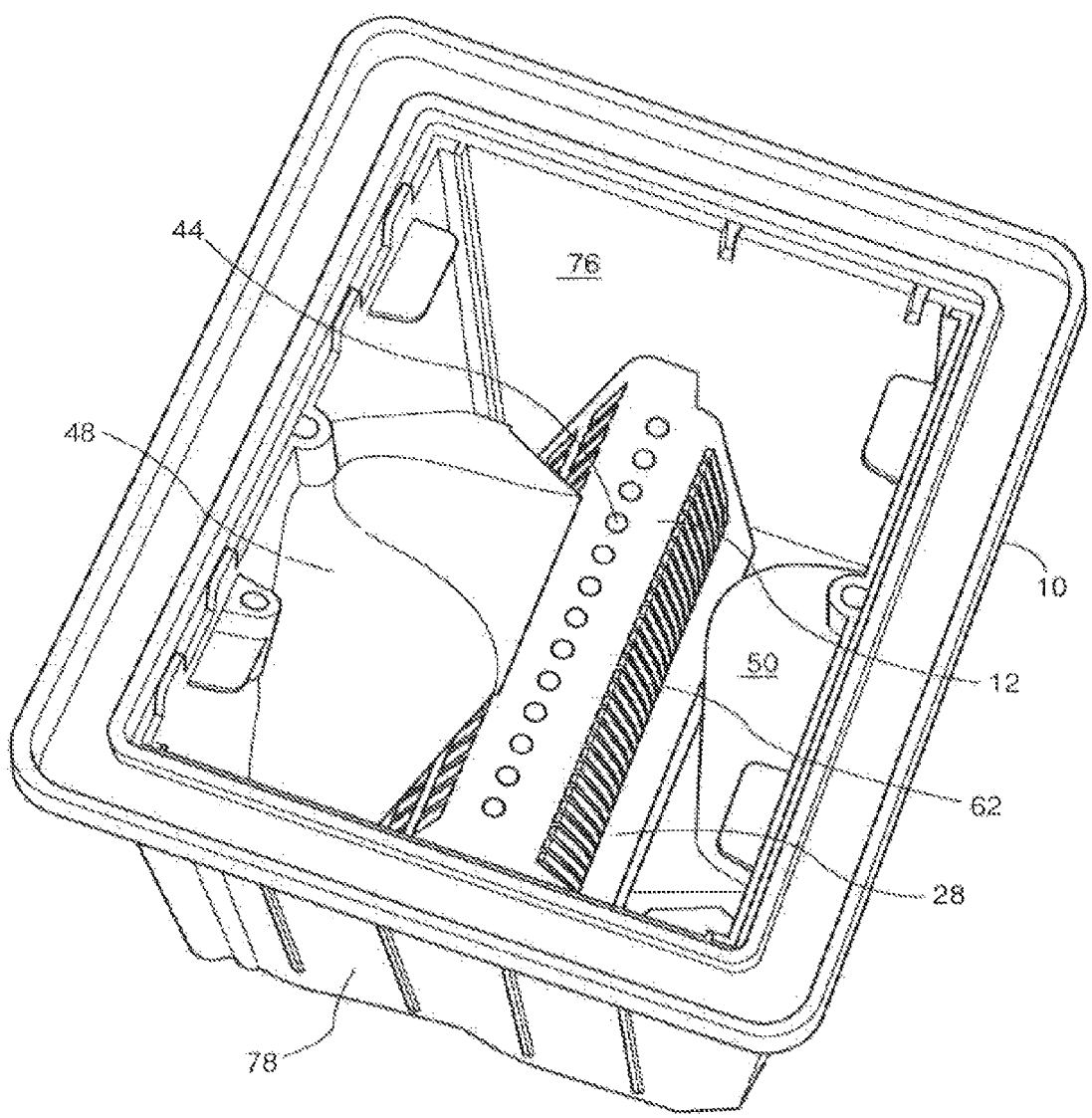
FIG. 16 is a top perspective view of an embodiment of the diffuser baffle.

FIG. 16 shows the diffuser baffle 12 in a grease interceptor 10 having side walls 76 and 78.

Figure 5:
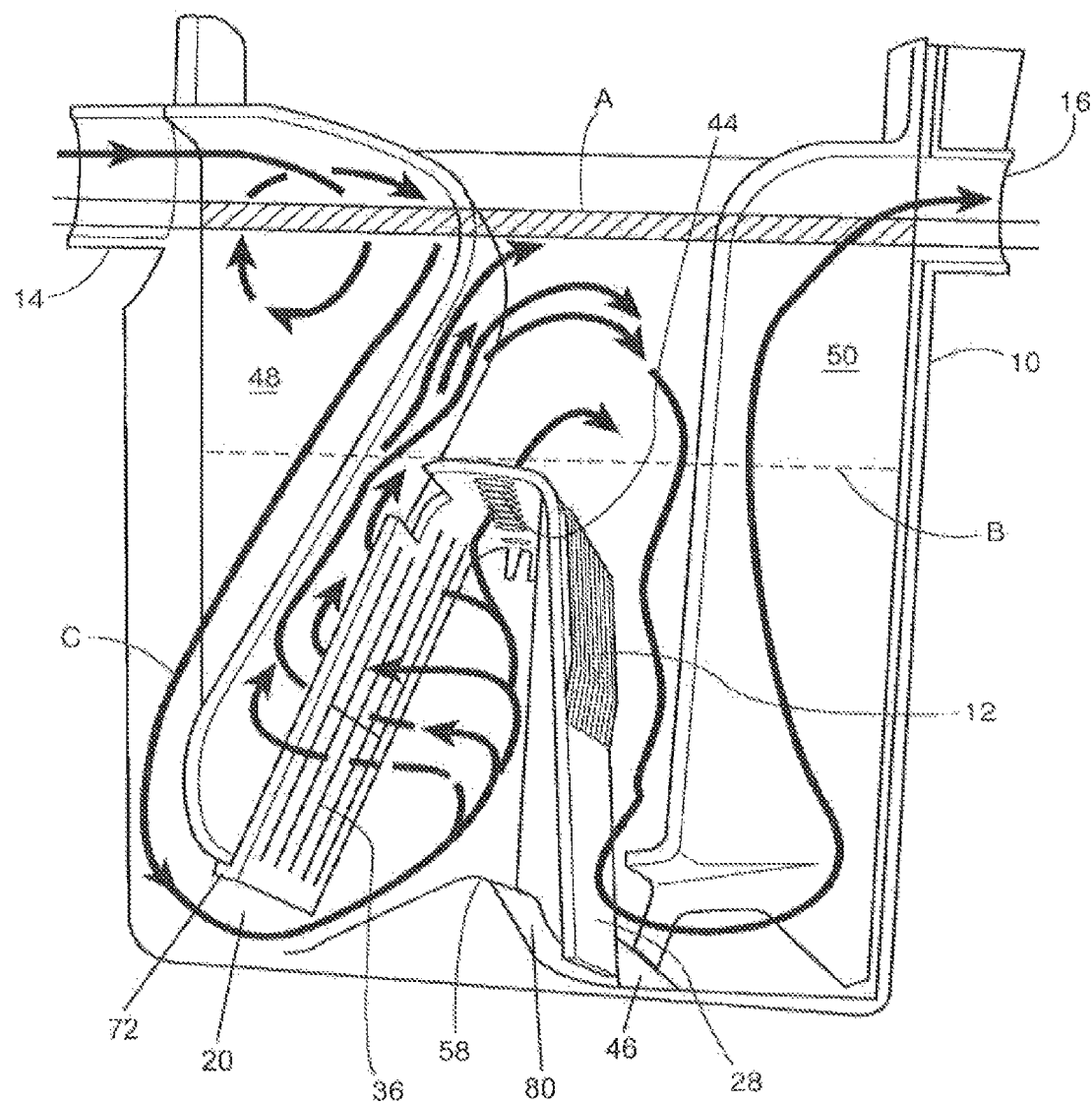
FIG. 5 is a cut-away side perspective view showing wastewater flow through an embodiment of the diffuser baffle in an in-line grease interceptor.
Figure 6:
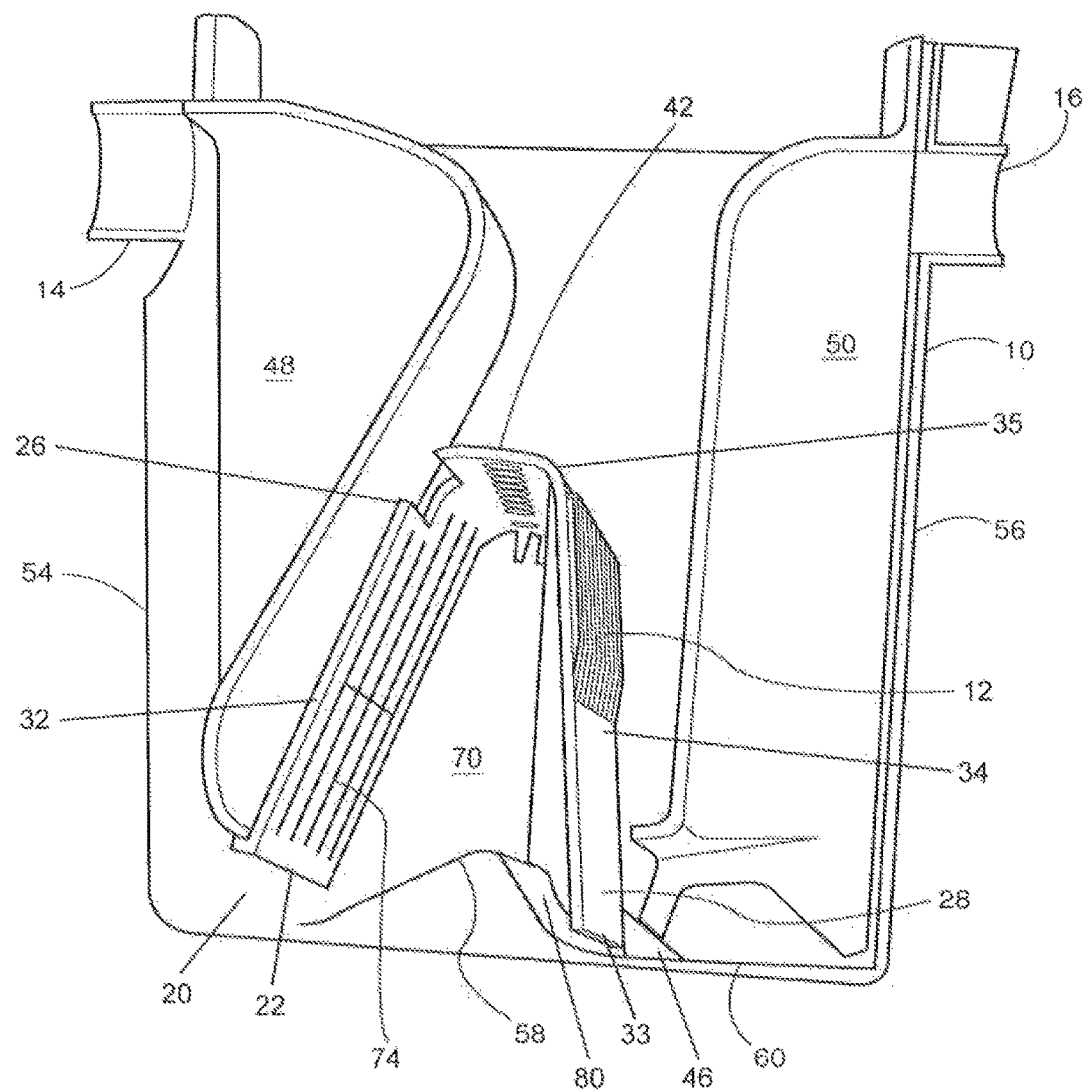
FIG. 6 is a cut-away side perspective view of an embodiment of the diffuser baffle in an in-line grease interceptor.

As shown in FIG. 5, the general flow path of the wastewater is denoted by the reference character C. The flow path of the influent is lengthened by creating a "W"-shaped flow path. The slope 58 on the bottom 60 of the grease interceptor 10 assists in directing wastewater flow upward through the diffuser baffle 12. Additionally heavier or semi-buoyant any entrained solids will be encouraged to follow the profile of ramp 58 collecting between ramp 58 and deflector wall 28. The path of least resistance of the flow is reversed by the deflector portion 28 of the diffuser baffle 12 and the flow is directed diagonally upward where it passes through slots 36 that distribute flow equally over the surface, minimizing turbulence. Some of the flow also travels through openings 44 on the top portion 42 of the diffuser baffle 12. The resulting flow path actively allows for the formation and separation of FOG globules that will then float to the surface where there is a water and FOG transition. To reach the outflow opening 16, the flow is bounded by the water and FOG transition and naturally passes over the top of the baffle 12 and downward toward the bottom 60 (FIG. 6) for discharge via the outlet baffle 50. The flow path within the grease tank 10 is maximized by creating the "W" profile, which gives increased opportunity for the FOG to separate from the wastewater thereby increasing operation efficiency. The "W" profile of the flow path can be seen as shown by the general path C in FIG. 5 where the inflow opening 14 is on the left-hand side of the figure and the outflow opening 16 is on the right-hand side of the figure.

The flow velocity of the wastewater is managed by the directional effect of the perforations or apertures in the faces of the baffle 12. These perforations are a collection of circular openings 44 and vertically oriented slots 36 that diffuse flow using different hydromechanical characteristics to aid the separation of FOG from the influent.

As shown in FIG. 5, the level at which the water and FOG transition will initially form is denoted by the reference character A, at the height of the inflow opening 14 and outflow opening 16. As the FOG and water transition accumulates more FOG, the transition begins at a lower height in the grease collection chamber 18. Eventually, the FOG and water transition will approach the level denoted by the reference character B. In the event that the grease interceptor 10 accumulates sufficient grease to prevent the full flow path to be followed by the influent, a group of vertical openings 62 allow for redirection within the baffle 12 and exit of the separated grease to the remaining holding capacity within the tank 10. As shown in FIG. 10, the vertical openings are baffled, with covers or baffles 40 over the openings 62. The baffled openings 62 by their profile, act as consolidation surfaces for grease and, employing the natural coalescing properties of grease, concentrate the FOG into globules before releasing it vertically to accumulate at the water and FOG transition.

The handle 30 (FIG. 10) allows for easy removal and refitting of the diffuser baffle 12 within the grease interceptor 10 during regular maintenance. As shown in FIG. 10, the handle 30 is a central lifting location that is integrated to the moulding. In other embodiments, the handle may be located on other sections of the diffuser baffle 10 and, for example, may be formed by an outwardly extending protrusion forming a handle, as long as the handle does not create turbulent flow and is within reach of an operator either directly or through lifting equipment so that the diffuser baffle 12 may be lifted out of the grease interceptor 10.

The V-shaped design of the diffuser baffle 12 has an angled profile, meaning the first inclined face 32 and second inclined face 34 are closer to each other near the top portion 42 and farther from each other near the open bottom of the diffuser baffle 12. The angled profile acts to concentrate the flow past the openings 44 and slots 36 on the upper end of the diffuser baffle 12.

Figure 8:
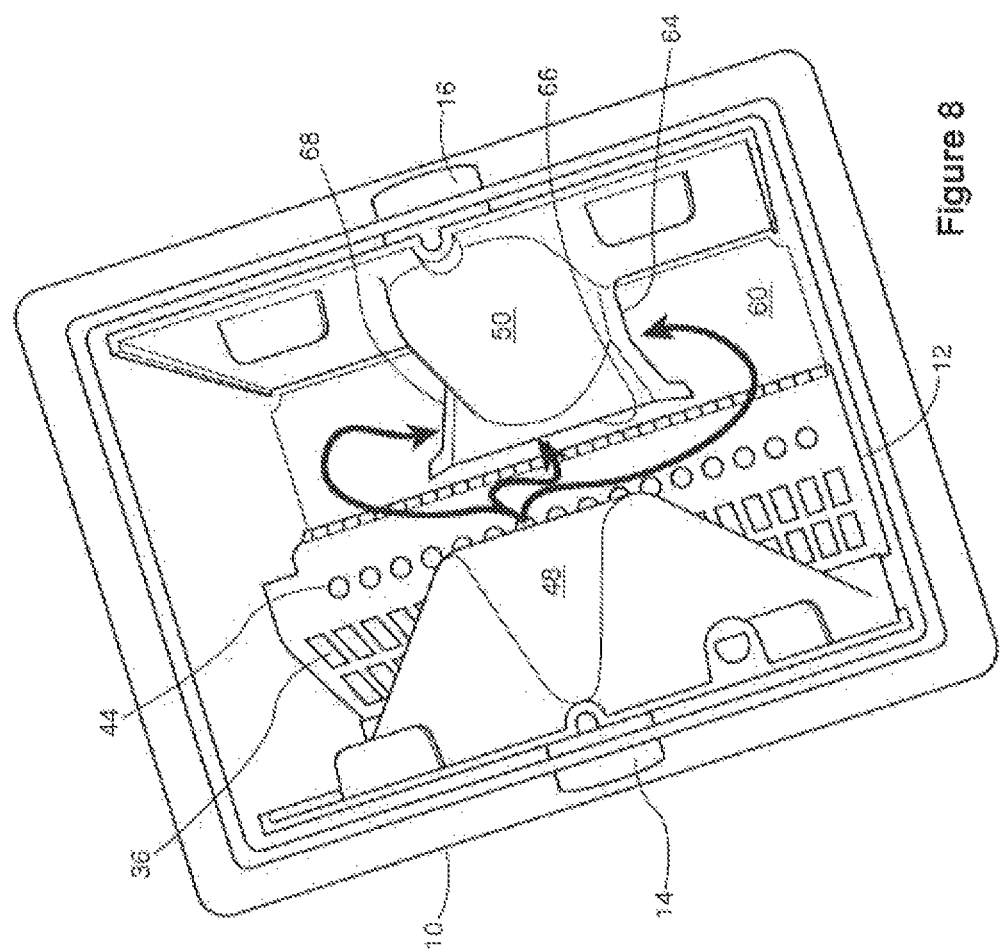
FIG. 8 is a top perspective view of an embodiment of the diffuser baffle in an in-line grease interceptor with a triple outlet baffle.

As shown in FIG. 8, the diffuser baffle 12 is used in conjunction with a tri-inlet, outlet baffle 50 which serves to maximize the open area at the outlet but draws flow from each of the left, right and upstream directions to further lengthen and distribute flow equally. As shown in FIG. 8, the outlet baffle 50 has inlet ports 64, 66, 68.

In the embodiment shown in FIG. 7, the plurality of apertures which permit the deflected wastewater stream to pass through the diffuser baffle 12 and into the grease collecting chamber are vertical slots 36 and circular openings 44. In other embodiments, the apertures may take various other shapes and forms so long as the deflected wastewater stream is directed in a flow path of a sufficient length to create sufficient separation of the FOG from the wastewater stream while also minimizing turbulence. In particular, the slots 36 need not be vertical and the openings 44 need not be circular. The slots 36 and openings 44 may each be composed of different shapes and each of the individual slots or openings may be different shapes from the other individual slots and openings. Similarly, the spacing between the slots 36 and openings 44 may be non-uniform so long as the flow is distributed more or less equally over the surface of the diffuser baffle 12. Moreover, in some embodiments, openings 44 may be eliminated from the top portion 42 so long as sufficient flow is established through slots 36 to allow for sufficient circulation of the wastewater stream. In some embodiments, the diffuser baffle 12 may be composed of first and second inclined faces 32, 34 without a corresponding top portion 42, as long as the flow is distributed adequately through the slots 36, for example by forming a generally shark fin-shaped.

In some embodiments the deflector portion 28 may consist of more or less than the lower half 38 of the second inclined face 34. The deflector portion 28 must be of sufficient size to redirected wastewater to pass through the slots 36 and openings 44 in the diffuser baffle 12. In some applications, where the FOG is emptied from the grease interceptor before the FOG and water transition reaches down to the level of the diffuser baffle 12, the deflector portion could extend up to the top portion of the diffuser baffle 12. In those cases, so long as the full flow path of the influent above the diffuser baffle 12 is not blocked, the baffled openings 62 may not be required. The baffled openings 62 may also take different shapes and forms, and may, so long as consolidation and coalescence of grease into concentrated parts is caused.

The support ribs 46 and retention tabs 72 in the embodiment shown in FIGS. 14-15 are an example of one method of securing the diffuser baffle 12 within the grease interceptor. In other embodiments, other methods of securing the diffuser baffle may be used, such as, for example, tabs on the diffuser baffle 12 which may be snapped into recesses in the base of the grease interceptor 10 or inserts on the diffuser baffle 12 which are placed into corresponding slots in the base of the grease interceptor 10, so long as the parts allow for easy removability from the grease interceptor and function to secure the diffuser baffle 12 from floating during operation. Alternatively an integrally molded or assembled handle extending to the underside of the lid could be used to similarly to maintain the position of the diffuser baffle.

The diffuser baffle 12 may be constructed from a broad range of materials including but not limited to moulded or formed plastic. As noted previously the most preferred material will be oliphillic in nature, or will be coated with a sustainable oliphillic coating.

In the claims, the word "comprising" is used in its inclusive sense and does not exclude other elements being present. The indefinite article "a" before a claim feature does not exclude more than one of the feature being present.

It will be appreciated that the foregoing description is intended by way of example only and that many variations and modifications to the invention are comprehended without departing from the broad spirit of the claims which are attached. Some of these variations are discussed above and others will be apparent to those skilled in the art. For example, while the preferred form of the invention is moulded plastic, metal or other materials could also be used. However, plastic is preferred for its low cost, and ease of manufacture among other reasons.

What is claimed is:

1. A grease interceptor and diffuser assembly comprising:
a grease interceptor including:
   a wastewater fluid inflow opening;
   a wastewater fluid outflow opening in fluid communication with the inflow opening;
   a grease collecting chamber hydraulically located between the inflow opening and the outflow opening;
   a floor disposed at a lowermost extent of the grease interceptor;
   an inlet baffle in fluid communication with the inflow opening and adapted to direct the fluid downward toward the floor; and
   an outlet baffle in fluid communication with the outflow opening and adapted to direct the fluid upward from the floor to the outflow opening;
a diffuser disposed in the grease collecting chamber, the diffuser including:
   a first panel extending between a first panel lower edge and a first panel opposite upper edge, the first panel being disposed upright adjacent the inlet baffle, the first panel lower edge being elevated above the floor so as to allow the fluid to flow beneath the first panel lower edge;
   a second panel extending between a second panel lower edge and a second panel opposite upper edge, the second panel being disposed upright adjacent the outlet baffle, the second panel lower edge being in contact with the floor so as to prevent fluid flow beneath the second panel lower edge;
   a top portion extending transversely between the first panel upper edge and the second panel upper edge;
   apertures through the first panel and the top portion; and
   an interior space enclosed by the first panel, the second panel, and the top portion, the interior space being in fluid communication with grease collecting chamber; wherein
   the fluid is adapted to flow from the inlet baffle beneath the first panel lower edge into the interior space, upward through the apertures into the grease collecting chamber, and downward into the outlet baffle; and
   fats, oils and grease (FOG) will separate from the fluid in the grease collecting chamber.

2. The grease interceptor and diffuser assembly of claim 1, wherein the second panel further comprises a solid deflector portion adapted to deflect the fluid flow away from the second panel, and direct the fluid flow toward the first panel.

3. The grease interceptor and diffuser assembly of claim 2, wherein:
the deflector portion further comprises at least a lower portion of the second panel, the lower portion having no openings for the fluid flow; and
the deflector portion is adapted to reverse the fluid flow.

4. The grease interceptor and diffuser assembly of claim 2, further comprising a ramp disposed on the floor of the grease collecting chamber between the first panel and the second panel, the ramp being adapted to direct the fluid flow toward the deflector portion.

5. The grease interceptor and diffuser assembly of claim 2, wherein the second panel further comprises:
second panel openings above the deflector portion to allow the fluid flow through the second panel; and
second panel covers over the second panel openings and spaced apart from the second panel openings; wherein the second panel openings and second panel covers are adapted to allow laminar flow therethrough, and to allow coalescence of the FOG into concentrated parts, and to allow separation of the FOG from the fluid.

6. The grease interceptor and diffuser assembly of claim 4, further comprising a solids retention area between the second panel deflector portion and the ramp, so as to collect heavy entrained solids.

7. The grease interceptor and diffuser assembly of claim 1, wherein the apertures through the first panel are adapted to allow laminar flow therethrough.

8. The grease interceptor and diffuser assembly of claim 1, wherein the diffuser is removably mounted in the grease collecting chamber and the diffuser includes a handle for lifting the diffuser out of the grease collecting chamber.

9. The grease interceptor and diffuser assembly of claim 1, wherein the diffuser is substantially shaped like an inverted V.

10. The grease interceptor and diffuser assembly of claim 1, wherein the apertures through the top portion are circular.

11. The grease interceptor and diffuser assembly of claim 1, wherein the diffuser includes retention tabs on the first panel lower edge, which engage the inlet baffle to locate and retain the diffuser in place in the grease interceptor.

12. A grease interceptor and diffuser assembly comprising:
a grease interceptor including:
   a wastewater fluid inflow opening;
   a wastewater fluid outflow opening in fluid communication with the inflow opening;
   a grease collecting chamber hydraulically located between the inflow opening and the outflow opening;
   a floor disposed at a lowermost extent of the grease interceptor;
   an inlet baffle in fluid communication with the inflow opening and the grease collecting chamber, and adapted to direct the fluid downward toward the floor;
   an outlet baffle in fluid communication with the outflow opening and the grease collecting chamber, and adapted to direct the fluid upward from the floor to the outflow opening;
   a ramp disposed on the floor between the inlet baffle and the outlet baffle, the ramp being adapted to direct the fluid flow upward away from the floor;
a diffuser disposed in the grease collecting chamber, the diffuser including:
   a first panel extending between a first panel lower edge and a first panel opposite upper edge, the first panel being disposed upright adjacent the inlet baffle, the first panel lower edge being elevated above the floor so as to allow the fluid to flow beneath the first panel lower edge;
   a second panel extending between a second panel lower edge and a second panel opposite upper edge, the second panel being disposed upright adjacent the outlet baffle, the second panel lower edge being in contact with the floor so as to prevent fluid flow beneath the second panel lower edge, the second panel having a solid deflector portion adapted to engage the fluid flow from the ramp, deflect the fluid flow away from the second panel, and direct the fluid flow toward the first panel, the second panel and the ramp forming a solids retention area therebetween so as to collect heavy entrained solids;

a top portion extending transversely between the first panel upper edge and the second panel upper edge;

an interior space enclosed by the first panel, the second panel, and the top portion, the interior space being in fluid communication with the grease collecting chamber; and apertures through the first panel and the top portion, and openings through the second panel, so as to allow the fluid to flow from the interior space through the first panel, the second panel, and the top portion, into the grease collecting chamber; wherein the diffuser is adapted to cause the fluid to flow from the inlet baffle beneath the first panel lower edge into the interior space, upward through the apertures and openings into the grease collecting chamber, and downward into the outlet baffle; and fats, oils and grease (FOG) will separate from the fluid in the grease collecting chamber.

13. The grease interceptor and diffuser assembly of claim 12, wherein:

the deflector portion further comprises at least a lower portion of the second panel, the lower portion having no openings for the fluid flow; and the deflector portion is adapted to reverse the fluid flow.

14. The grease interceptor and diffuser assembly of claim 13, wherein the second panel further comprises:

the second panel openings being disposed above the deflector portion; and second panel covers over the second panel openings and spaced apart from the second panel openings; wherein the second panel openings and second panel covers are adapted to allow laminar flow therethrough, and to allow coalescence of the FOG into concentrated parts, and to allow separation of the FOG from the fluid.

15. The grease interceptor and diffuser assembly of claim 12, wherein the diffuser includes retention tabs on the first panel lower edge, which engage the inlet baffle to locate and retain the diffuser in place in the grease interceptor.

16. A method for separating the FOG from the wastewater fluid in the grease interceptor and diffuser assembly of claim 12, the method comprising:

allowing the fluid to flow into the inflow opening, through the inlet baffle and toward the floor of the grease interceptor;

directing the fluid flow away from the floor with the ramp and upward into the diffuser in the grease collecting chamber;

directing the fluid flow from the ramp toward the solid deflector portion on the second panel of the diffuser;

deflecting the fluid flow away from the second panel and directing the fluid flow toward the first panel of the diffuser with the deflector portion;

causing the fluid to flow upward through the apertures in the diffuser into the grease collecting chamber;

separating the FOG from the fluid in the grease collecting chamber;

causing the fluid to flow toward the floor, through the outlet baffle, and upward to the outflow opening; and removing the FOG from the grease collecting chamber.

17. The method of claim 16, further comprising reversing the fluid flow with the deflector portion.

18. The method of claim 16, further comprising:

elevating the first panel lower edge above the floor and allowing the fluid to flow beneath the first panel lower edge;

juxtaposing the second panel lower edge in contact with the floor and preventing fluid flow beneath the second panel lower edge;

extending the top portion transversely between the first panel upper edge and the second panel upper edge;

enclosing the interior space with the first panel, the second panel, and the top portion, and connecting the interior space in fluid communication with the grease collecting chamber;

forming the apertures through the first panel and the top portion;

forming the openings through the second panel;

causing the fluid to flow from the interior space upward through the apertures and openings into the grease collecting chamber; and causing the fluid to flow downward into the outlet baffle and out the outflow opening.

19. The method of claim 18, further comprising:

forming the solids retention area between the diffuser and the ramp; and collecting the heavy entrained solids in the retention area.

20. The method of claim 19, further comprising:

disposing the second panel openings above the deflector portion;

disposing second panel covers over the second panel openings and spacing the second panel covers apart from the second panel openings;

allowing the fluid to flow through the second panel openings and second panel covers with laminar flow;

coalescing of the FOG into concentrated parts with the second panel openings and second panel covers; and allowing separation of the FOG from the fluid with the second panel openings and second panel covers.

21. A method for separating the FOG from the wastewater fluid in the grease interceptor and diffuser assembly of claim 12, the method comprising:

connecting the wastewater fluid inflow opening in fluid communication with the wastewater fluid outflow opening in the grease interceptor;

locating the grease collecting chamber hydraulically between the inflow opening and the outflow opening;

connecting the inlet baffle in fluid communication with the inflow opening and the grease collecting chamber, and directing the fluid downward toward the interceptor floor with the inlet baffle;

connecting the outlet baffle in fluid communication with the outflow opening and the grease collecting chamber, and directing the fluid upward from the interceptor floor to the outflow opening with the outlet baffle;

allowing the fluid to flow into the inflow opening, through the grease collecting chamber and out the fluid outflow opening;

disposing the ramp on the floor between the inlet baffle and the outlet baffle, and directing the fluid flow upward away from the floor with the ramp;

disposing the diffuser in the grease collecting chamber with the first panel upright adjacent the inlet baffle and the second panel upright adjacent the outlet baffle;

elevating the first panel lower edge above the floor so as to allow the fluid to flow beneath the first panel lower edge;
juxtaposing the second panel lower edge in contact with the floor and preventing the fluid flow beneath the second panel lower edge;
directing the fluid flow from the ramp toward the solid deflector portion on the second panel;
deflecting the fluid flow away from the second panel and directing the fluid flow toward the first panel with the deflector portion;
forming the solids retention area between the second panel and the ramp and collecting the heavy entrained solids in the retention area;
extending the top portion transversely between the first panel upper edge and the second panel upper edge;
enclosing the interior space with the first panel, the second panel, and the top portion, and connecting the interior space in fluid communication with the grease collecting chamber;
forming the apertures through the first panel and the top portion;
forming the openings through the second panel;
causing the fluid to flow from the inlet baffle beneath the first panel lower edge into the interior space;
causing the fluid to flow from the interior space upward through the first panel, the second panel, and the top portion, into the grease collecting chamber;
separating the FOG from the fluid in the grease collecting chamber;
causing the fluid to flow downward into the outlet baffle; and
removing the FOG from the grease collecting chamber.

22. The method of claim 21, further comprising:
disposing the second panel openings above the deflector portion;
disposing second panel covers over the second panel openings and spacing the second panel covers apart from the second panel openings;
allowing the fluid to flow through the second panel openings and second panel covers with laminar flow;
coalescing of the FOG into concentrated parts with the second panel openings and second panel covers; and
allowing separation of the FOG from the fluid with the second panel openings and second panel covers.

* * * * *